United States Patent [19]

Schneider et al.

[11] Patent Number: 5,231,552

[45] Date of Patent: Jul. 27, 1993

[54] MAGAZINE AND RECEIVER FOR MEDIA CARTRIDGE LOADER

[75] Inventors: Günther Schneider, Germaringen; Klaus Paulat, Schwendi, both of Fed. Rep. of Germany

[73] Assignee: Digital Equipment Corporation, Maynard, Mass.

[21] Appl. No.: 546,089

[22] Filed: Jun. 29, 1990

[51] Int. Cl.[5] .................. G11B 15/68; B65D 85/672; A47G 29/00

[52] U.S. Cl. .................... 360/92; 360/96.6; 206/387; 220/765; 211/DIG. 1; 211/40

[58] Field of Search ............ 360/92, 96.6, 137, 34–39, 360/92; 206/387, 444, 445, 459; 220/94 A, 94 R, 522; 211/DIG. 1, 40; 353/25, 26 A, 26 R

[56] References Cited

U.S. PATENT DOCUMENTS

| | | | |
|---|---|---|---|
| 3,308,997 | 3/1967 | Kelly | 220/94 R |
| 3,864,738 | 2/1975 | Syohji | 360/66 |
| 3,879,758 | 4/1975 | Pyles | 360/92 |
| 3,938,190 | 2/1976 | Semmlow et al. | 360/72 |
| 3,945,040 | 3/1976 | Staar | 360/137 |
| 4,092,685 | 5/1978 | Sander et al. | 360/92 |
| 4,198,665 | 4/1980 | Hoefnagels | 360/96.6 |
| 4,240,120 | 12/1980 | Padwa | 360/92 |
| 4,325,091 | 4/1982 | Uchida | 360/96.6 |
| 4,601,397 | 7/1986 | Neumeier | 209/608 |
| 4,697,215 | 9/1987 | Hata | 360/92 |
| 4,709,815 | 12/1987 | Price et al. | 206/387 |
| 4,712,145 | 12/1987 | Naruki et al. | 360/137 |
| 4,779,151 | 10/1988 | Lind et al. | 360/92 |
| 4,815,055 | 3/1989 | Fago, Jr. | 369/36 |
| 4,828,341 | 5/1989 | Bohnet et al. | 206/387 |
| 4,832,195 | 5/1989 | Dahl | 206/387 |
| 4,850,485 | 7/1989 | Ishikawa | 206/387 |
| 4,918,548 | 4/1990 | O'Donnell et al. | 360/92 |
| 4,940,275 | 7/1990 | Miki et al. | 360/92 |
| 4,993,010 | 2/1991 | Kishimura et al. | 369/36 |
| 5,021,902 | 6/1991 | Ishikawa et al. | 360/92 |
| 5,038,235 | 8/1991 | Ohzawa et al. | 360/92 |
| 5,041,929 | 8/1991 | Fryberger et al. | 360/92 |
| 5,050,020 | 9/1991 | Campbell et al. | 360/92 |
| 5,058,090 | 10/1991 | Ueno et al. | 369/34 |

OTHER PUBLICATIONS

StorageTek, Storagetek Edges IBM, Three other Rivals.

R. D. Parry et al., Article Selection System, Sep. 18, 1973, Re. 27,762.

Primary Examiner—Stuart S. Levy
Assistant Examiner—Jefferson Evans
Attorney, Agent, or Firm—Fish & Richardson

[57] ABSTRACT

A cartridge loader with a removable magazine that has slots for data storage cartridges. The loader has a tilting bin-like receiver in an opening in its front panel for receiving the magazine. The magazine includes a push-push mechanism associated with each of its cartridge storage cells. The magazine has a handle and a surface, preferably a thumb rail near the front, offset from the handle and placed in an area proximal to a usual resting position of a digit of a user, allowing the user to alter the magazine's attitude. The magazine includes a guide channel that interacts with a rib on the receiver to guide the magazine in the receiver. The magazine may have a center of gravity aligned with the handle, to cause the magazine to hang at a tilted attitude corresponding to the tilt angle of the receiver.

8 Claims, 13 Drawing Sheets

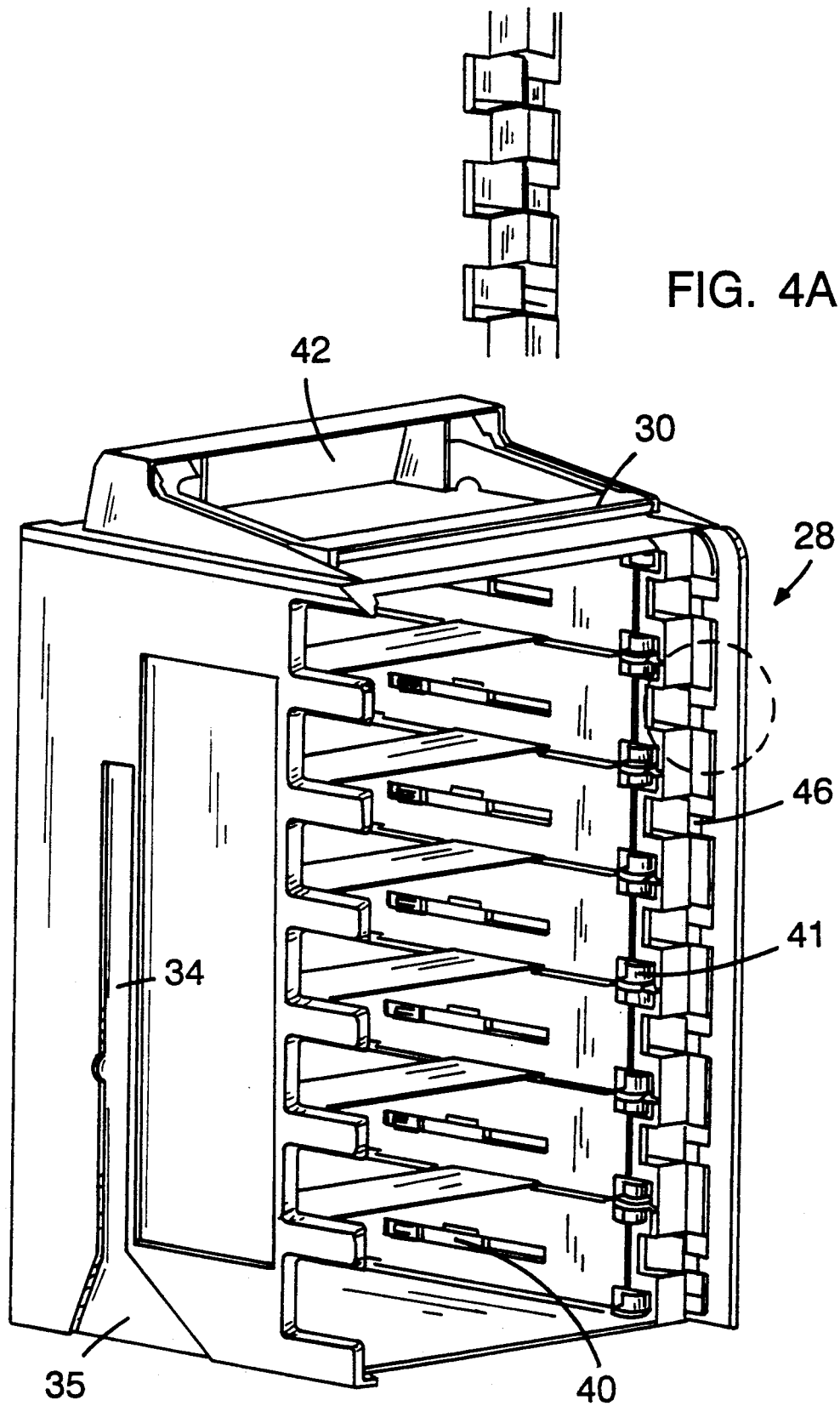

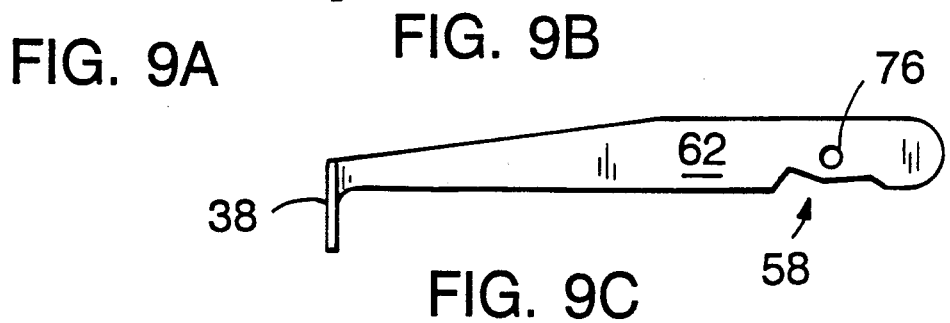
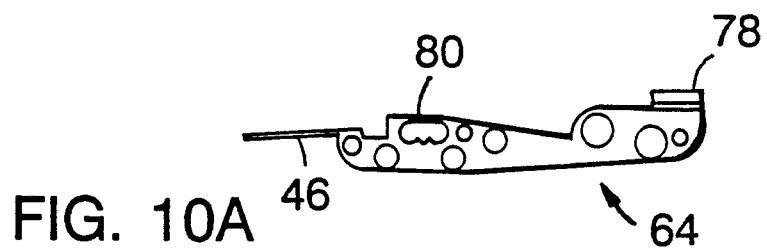
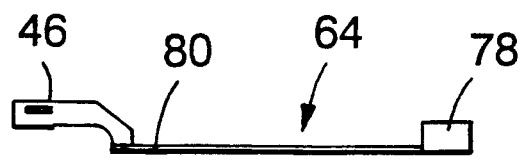
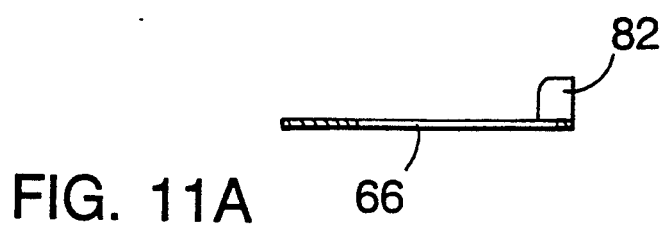
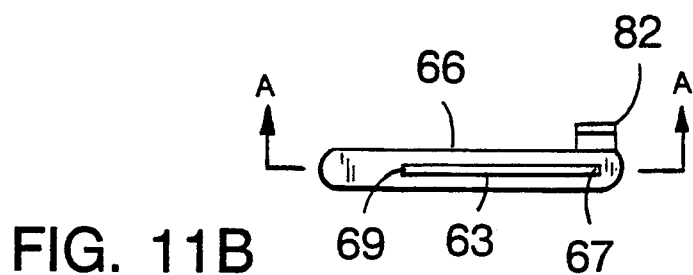

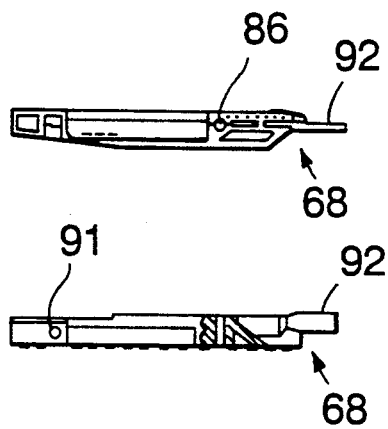
FIG. 12A
FIG. 12B
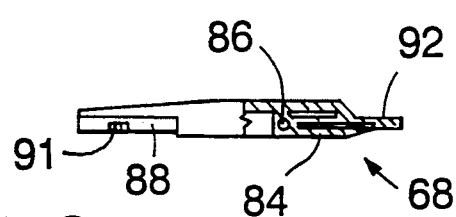
FIG. 12C
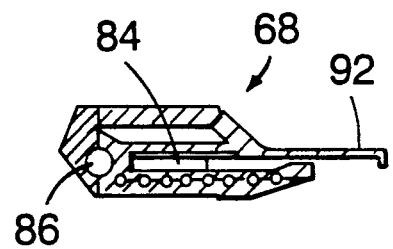
FIG. 12E
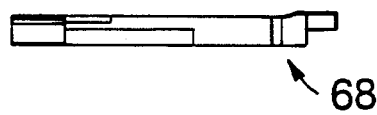
FIG. 12D
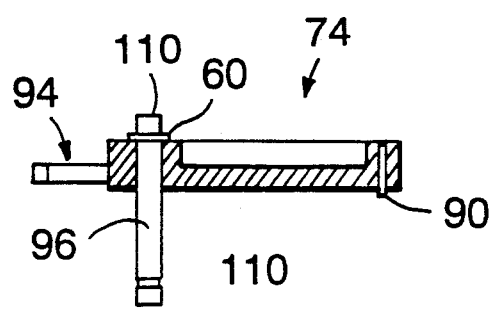
FIG. 13A
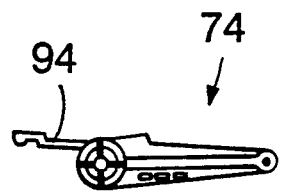
FIG. 13B

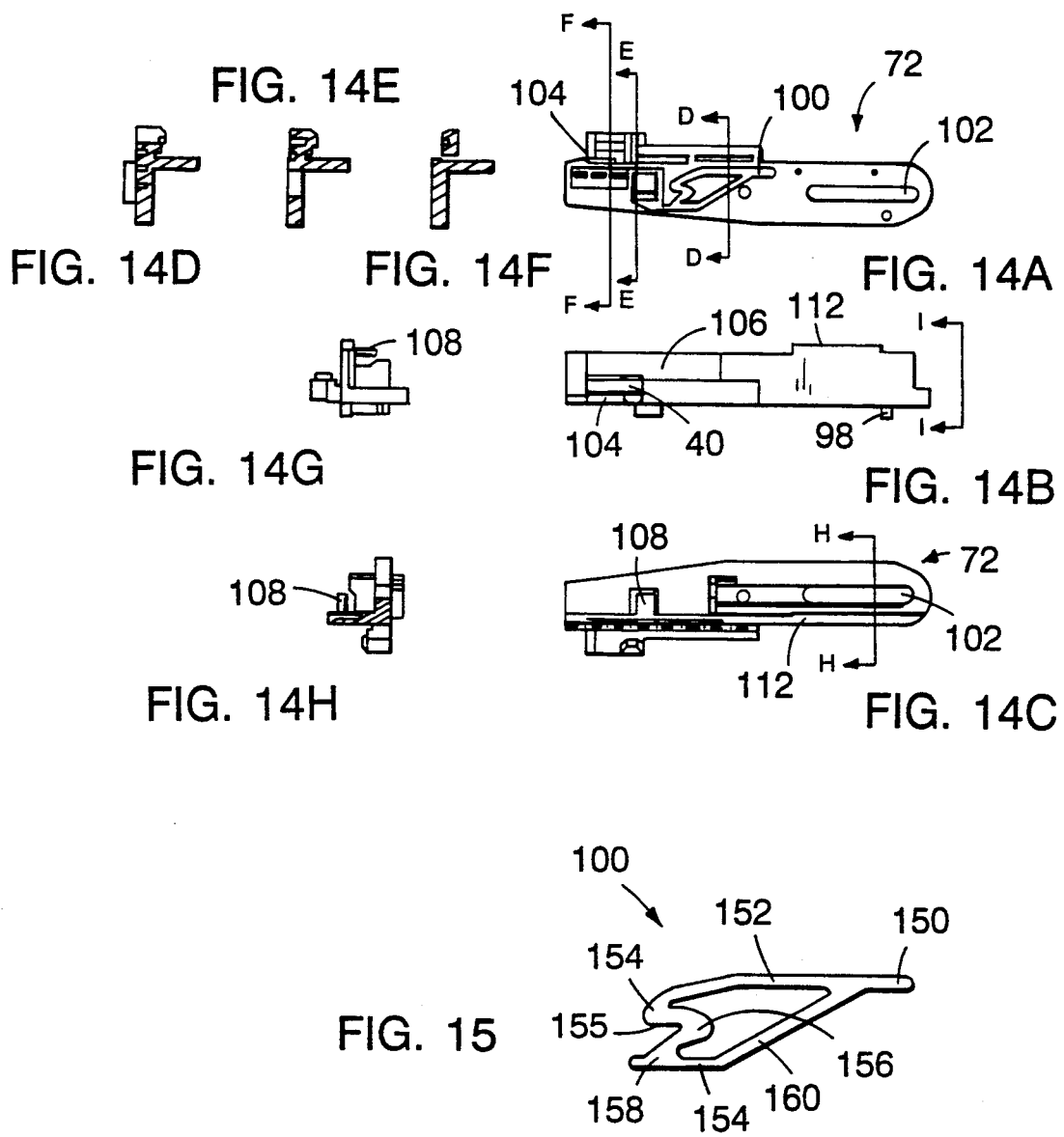

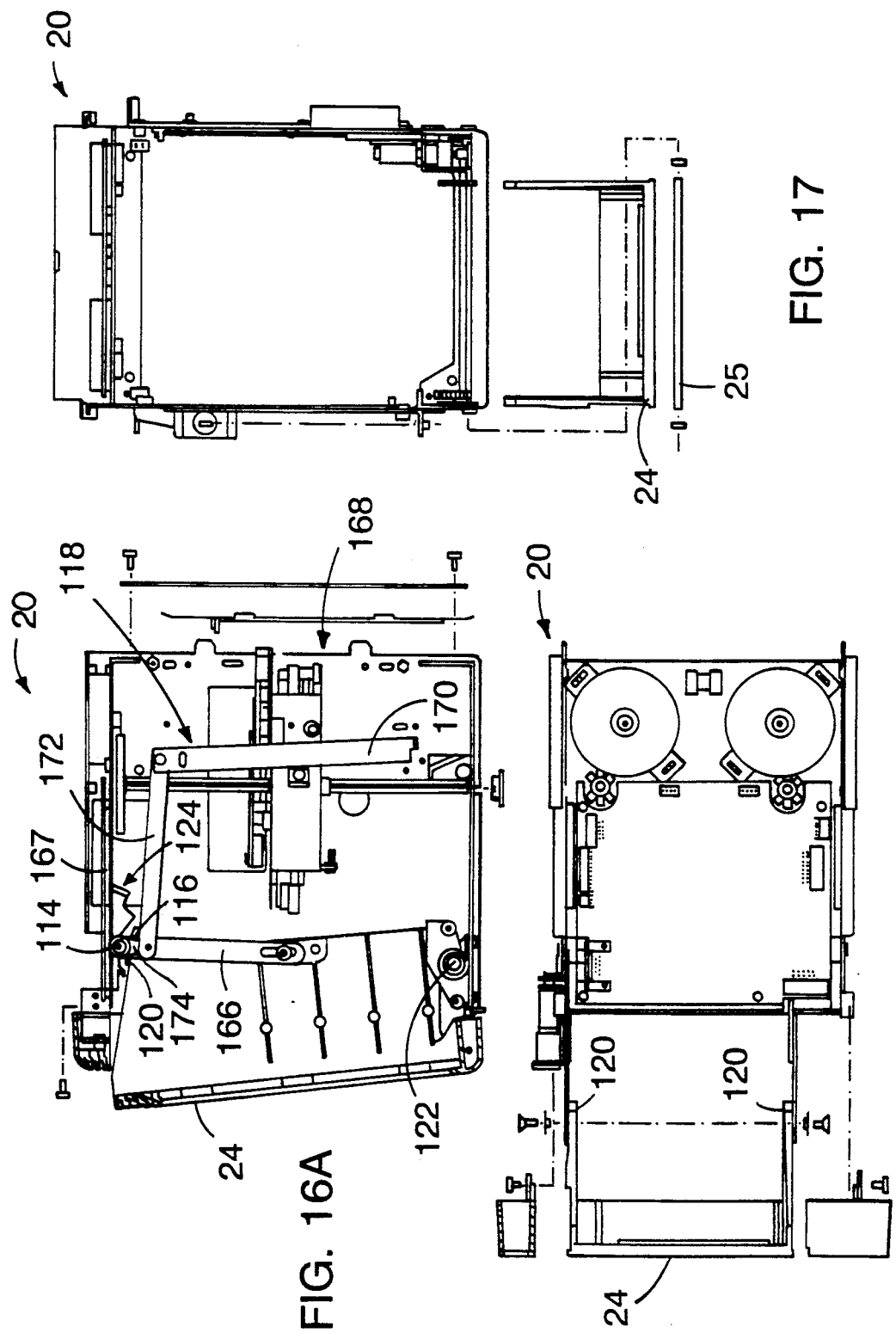

MAGAZINE AND RECEIVER FOR MEDIA CARTRIDGE LOADER

BACKGROUND OF THE INVENTION

This invention relates to storage devices that use removable cartridges.

In computer systems, data is often stored in removable cartridge-based media. These cartridges usually include a plastic case that protects the magnetic or optical medium contained therein. For large amounts of data, cartridge loaders that can handle multiple cartridges have been developed. These loaders typically hold several cartridges and automatically select a cartridge to be read by a single drive. Various mechanical designs have been proposed. Some mechanisms move the drive and others shuttle the cartridges from the cartridge storage area to the drive and back.

SUMMARY OF THE INVENTION

In one aspect, the invention features a cartridge loader with a removable magazine that has slots for data storage cartridges. The loader has a tilting bin-like receiver in an opening in its front panel for receiving the magazine. In another aspect, the invention features a magazine that includes a push-push mechanism associated with each of its cartridge storage cells. In a further aspect, the invention features a magazine with a handle and a surface, preferably a thumb rail near the front, offset from the handle that is placed in an area proximal to a usual resting position of a digit of a user, allowing the user to alter the magazine's attitude. In another aspect, a data cartridge loader includes a guide channel, which may include a tapered portion, that interacts with a rib on the receiver to guide the magazine in the receiver. In another aspect, the invention includes a magazine with a center of gravity aligned with the handle, which is preferably spring loaded, so as to cause the magazine to hang at a tilted attitude corresponding to the tilt angle of the receiver.

In the preferred embodiment, the receiver includes a spring that applies a force to move the receiver to the open position, and another spring that applies a force to the magazine only if the magazine is present in the receiver. The receiver includes a pair of notches, and a pair of pawls mounted on a shaft that engages them to maintain the receiver closed, the pawls being disengaged by an opening linkage that rotates the shaft to allow the receiver to be opened. The receiver has a front side approximately flush with the front panel when closed and preferably includes a window for viewing the cartridge. The push-push mechanism preferably includes a retention lever with a stop for retaining the cartridge and a cam follower which moves between two resting points on a cam surface when the cartridge is inserted or extracted from the magazine. The push-push mechanism also preferably includes a shutter with a flag end for indicating the presence, or type, of a cartridge in a cell. A bearing surface or the push-push mechanism may be activated to allow a cartridge to be released, preferably from the back side of the magazine. The handle is preferably hinged to the top on a pivot axis parallel to the front side with a stop positioned to predetermine the angular position of the handle.

The receiver of the invention takes up little space, requires little clearance in front of the loader, and does not interfere with neighboring computer peripheral devices when mounted in an equipment rack. The associated magazine allows a user to store and transport multiple cartridges as a single unit. The magazine is easy to use, as cartridges may be inserted and extracted using a simple push-push mechanism that provides kinesthetic feedback to the user when the cartridge is locked in place. This single compact mechanism provides several advantageous features. It locks the tapes in place, preventing them from being accidentally removed, supplies cartridge-type and cartridge-presence information to the loader via flags, and provides a mechanism for the loader to remove the cartridge from the magazine when needed. The placement of the center of gravity of the magazine and the placement of the handle and thumb-rail allow the magazine to be manipulated with ease into the receiver. Channels on the magazine interact with ribs in the receiver to make the insertion of the magazine simple and precise, and provide a satisfying and informative feeling of positive engagement when the magazine is inserted. The spring-loaded handle pivots flat onto the top of the magazine when not in use, thus taking up little space inside the loader. Multiple springs in the receiver provide a uniform and predictable opening force whether there is a magazine present in the loader or not.

Other advantages and features of the invention will be apparent from the following description of a preferred embodiment, and from the claims.

DESCRIPTION OF THE PREFERRED EMBODIMENT

FIGS. 4 and 4A are perspective drawings showing the rear of the magazine of FIG. 2.

FIG. 9 is a three-view orthographic projection of the retention lever shown in FIG. 9 wherein
 view A is a front view,
 view B is a left side view, and
 view C is a top plan view.

FIG. 10 is a two-view orthographic projection of the shutter shown in FIG. 9 wherein
 view A is a top plan view, and
 view B is a left side view.

FIG. 11 is a two-view orthographic projection of the slotted plate shown in FIG. 9 wherein
 view A is top plan view, and
 view B is a left side view.

FIG. 12 is a multi-view orthographic projection of the release lever shown in FIG. 9 wherein
 view A is a bottom plan view,
 view B is a right side view,
 view C is a top plan view, view D is a left side view, and view E is an enlarged portion of the back of the bottom plan view.

FIG. 13 is a two-view orthographic projection of the cam follower shown in FIG. 9 wherein view A is a left side view, and view B is a bottom plan view.

FIG. 14 is a multi-view orthographic projection of the lock lever shown in FIG. 9 wherein view A is a bottom view, view B is a right side view, view C is a top plan view, view D is a cross-section corresponding to the D—D line in view A, view E is a cross-section corresponding to the E—E line in view A, view F is a cross-section corresponding to the F—F line in view A, view G is a rear elevation corresponding to the G—G line in view A, and view H is a cross-section corresponding to the H—H line in view A.

FIG. 15 is a left side view of a portion of the lock lever of FIG. 14 showing its cam surface.

Figure 1:
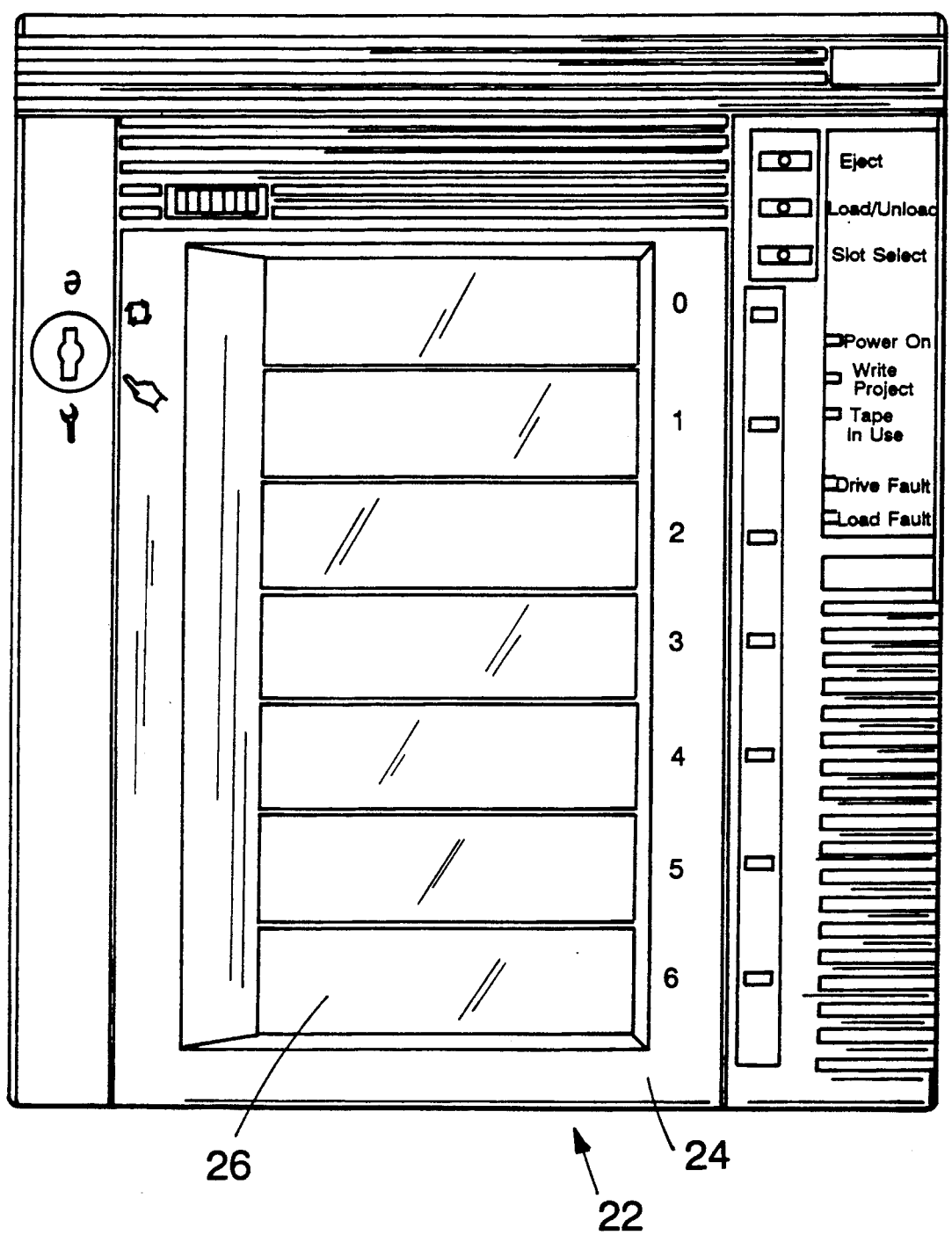
FIG. 1 is a front elevation of the cartridge loader of the invention.

FIG. 16 is a two-view orthographic projection of the loader of FIG. 1 wherein view A is a transparent side view, and view B is a top plan view.

FIG. 17 is a front elevation of the loader of FIG. 1 with the receiver removed therefrom.

Figure 18A:
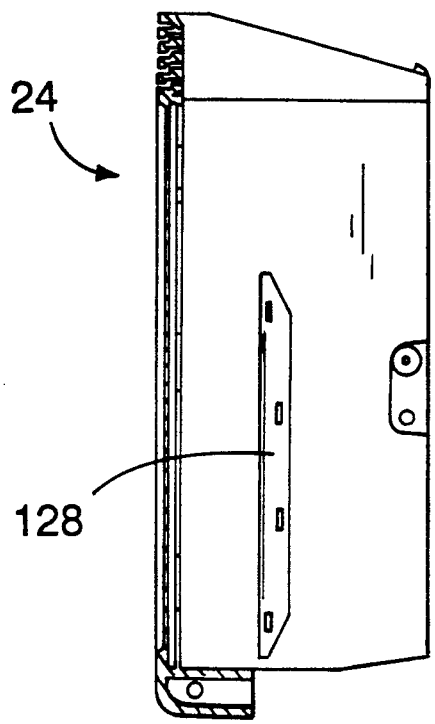
Figure 18B:
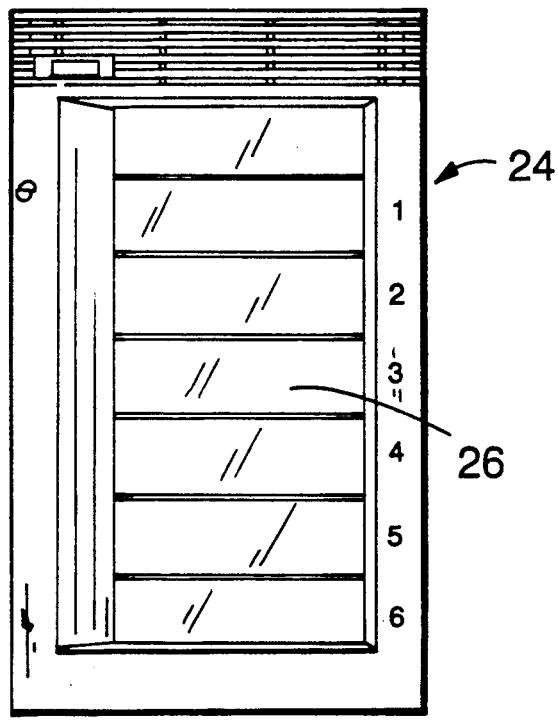
Figure 18C:
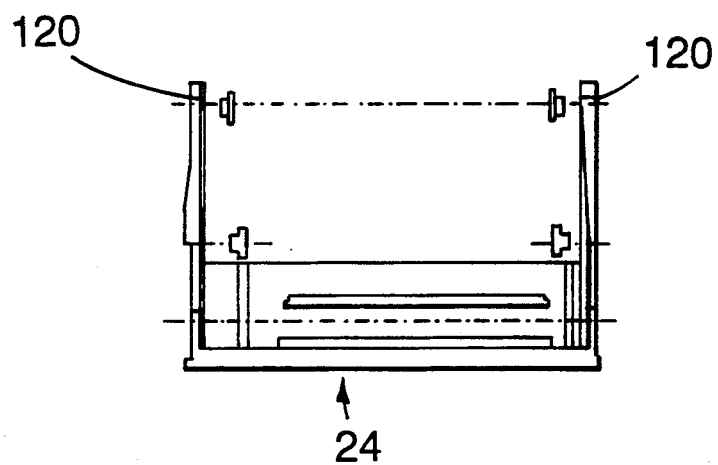

FIG. 18 is a three-view orthographic projection of the receiver shown in FIG. 1 wherein view A is a cross-sectional side view showing the interior of one wall, view B is a front elevation, and view C is a top plan view.

Figure 19A:
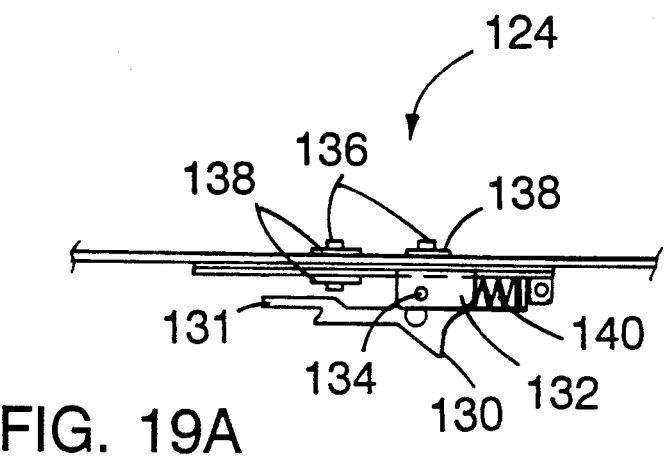
Figure 19C:
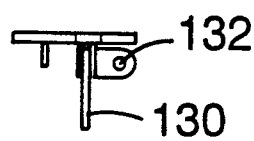
Figure 19B:
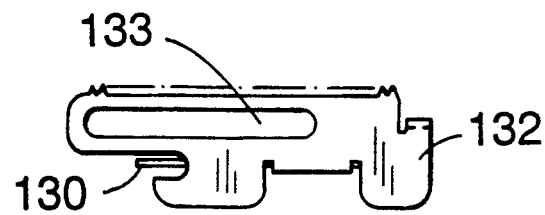

FIG. 19 is a three-view orthographic projection of the supplemental magazine ejection mechanism of the loader of FIG. 1 wherein view A is a left side elevation, view B is a top plan view, and view C is a front elevation.

Figure 20A:
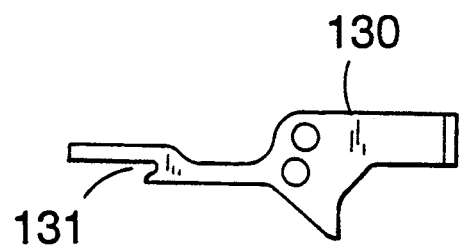
Figure 20B:
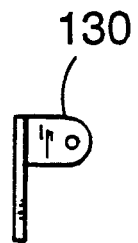

FIG. 20 is a two-view orthographic projection of the magazine catch shown in FIG. 19 wherein view A is a left side elevation, and view B is a front elevation.

The following detailed description is related to a commercial embodiment of the invention designed for Digital Equipment Corporation TK50 or TK70 tape cartridges. This cartridge format is approximately square as the cartridge contains just the supply reel, the TK70 streaming tape drive, or its successor the TK85, being equipped to thread the tape through the capstan and head components onto a takeup reel located in the drive itself. In the present design up to seven tape cartridges are stored in a removable magazine. The cartridges are selectively loaded into a single stationary drive located behind the cartridge loader. The design principles evident in the present embodiment may of course be applied to many other media loaders for a variety of applications.

FIG. 1 shows the front panel 22 of the loader. The front panel includes a receiver 24 with a window 26 that allows the user to read the labels of the cartridges in the loader. The loader is designed to occupy one half of the width of a standard computer rack.

Figure 2:
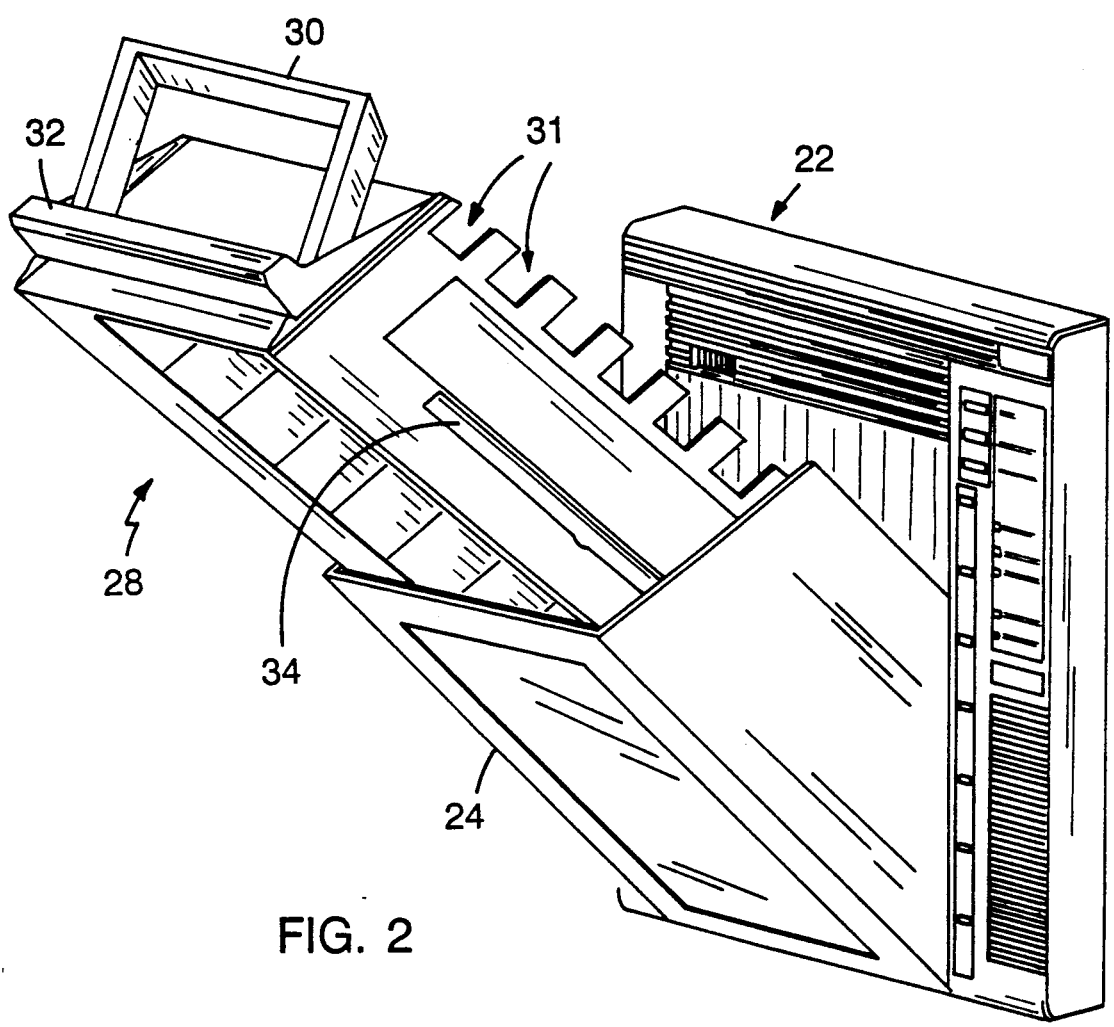
FIG. 2 is a perspective drawing showing a magazine partially inserted in the open receiver of FIG. 1.

Referring to FIG. 2, the receiver 24, a rectangular open bin, is pivotally attached (see shaft 25, FIG. 17) at the front of its base to the panel 22. The receiver pivots outward, as shown in FIG. 2, until stopped by a retaining bar 166 (FIG. 16), to allow for the insertion of a removable cartridge magazine 28. The magazine, in the form of an open rack, has a spring-loaded pivoting carrying handle 30 and seven cells 31 for holding cartridges.

Figure 3A:
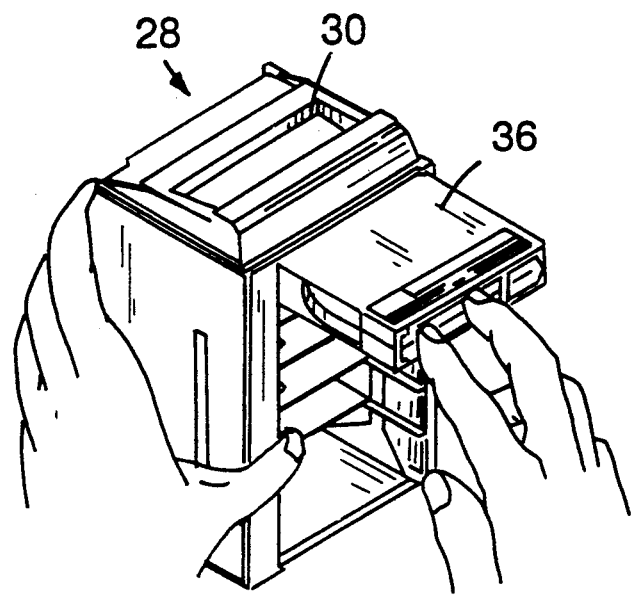
FIGS. 3A–3C are perspective views showing three stages of insertion of a cartridge into the magazine of FIG. 2.
Figure 3B:
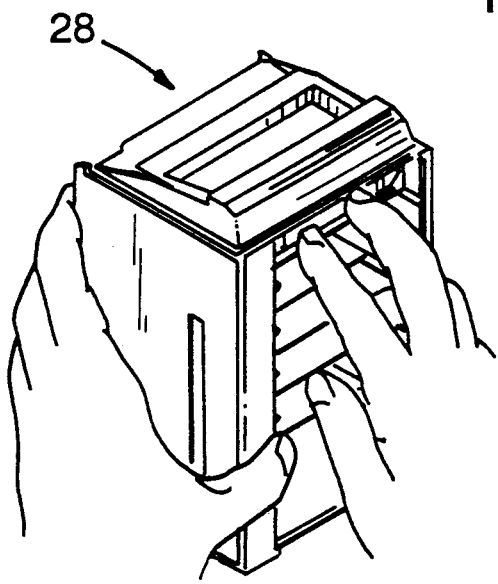
Figure 3C:
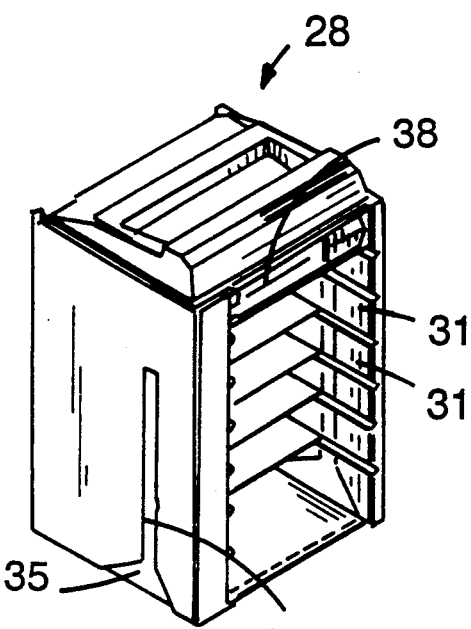

The cells 31 are each equipped with a push-push mechanism that may interact with a cartridge 36, as shown in FIG. 3. When a user inserts a cartridge into an empty cell, the user will encounter a slight resistance. As the user pushes the cartridge past a certain point, the user will feel a positive engagement of the mechanism. At this point, the mechanism has locked the cartridge in place by means of a retractable stop 38. The feeling of engagement indicates to the user that the cartridge is locked in place and that he or she may stop applying pressure to the cartridge.

In order to extract the cartridge, the user simply presses on the cartridge again, and the push-push mechanism releases the cartridge and pushes it out of the magazine slightly. This push-push operation is very simple to perform, and the kinesthetic feedback due to the positive engagement in the mechanism assures the user that the cartridge has been locked in place.

FIG. 4 shows the features of the back side of the magazine that interact with the loader and the cartridge. Each cell contains a slide 40 that may interact with a cartridge to actuate its corresponding push-push mechanism. Each push-push mechanism may affect the state of its associated flag 46. This flag adopts one of three positions to indicate the status of the contents of its associated cell. The most withdrawn position indicates the lack of a cartridge in the cell, and the central and extended positions each indicate the occupation of the cell by one of two different cartridge types. The position of the flags may be read by optical detectors within the loader mechanism. Rollers 41 ease the movement of the cartridges.

As shown in FIGS. 2, 3 and 4, the magazine is in the form of a box with an open front and back. The walls, top and bottom of the magazine comprise interlocking injection molded plastic components. The intercell partitions 37 are aluminum panels with T-shaped tabs on the both ends (not shown) which during assembly fit through mating slots on the walls. The ends of the tabs are twisted to positively anchor the sidewalls to each other.

Figure 5:
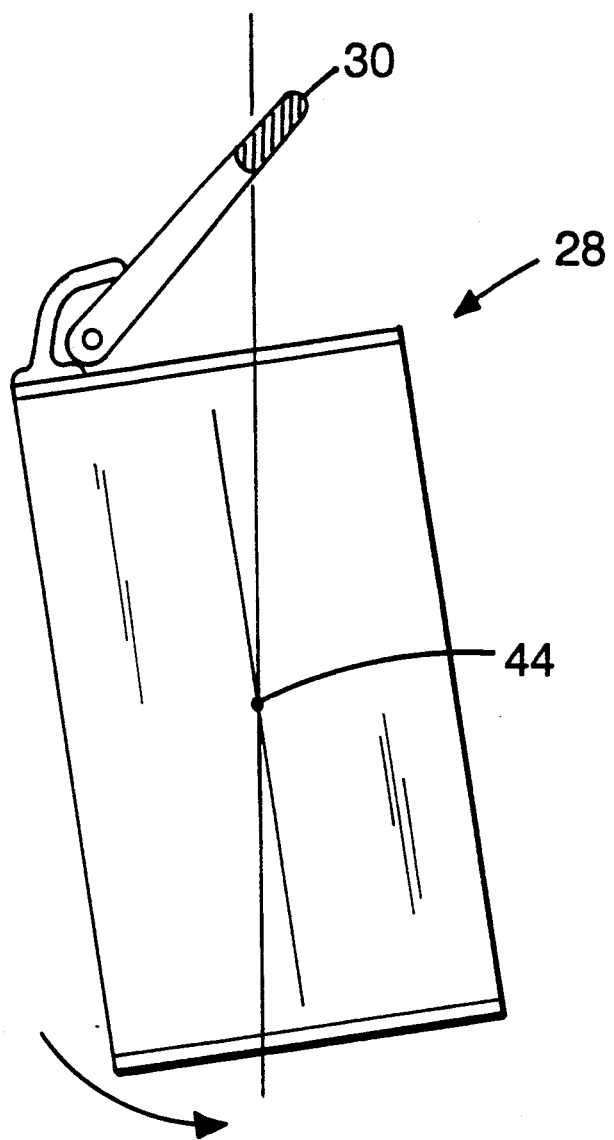
FIG. 5 is a side elevation of the magazine of FIG. 2 as it would appear if suspended from its handle.

The magazine has been ergonomically designed to be simple and intuitive to use. Referring to FIG. 5, the handle 30 is hinged so that the center of gravity 44 causes the magazine to tilt slightly while being held by a user. This tilt is in the same direction as the tilt of the opened receiver, simplifying insertion. To encourage the user to hold the magazine by its handle, the void 42 under the thumb rail is preferably filled to prevent the user from carrying the magazine by the thumb rail.

Figure 6:
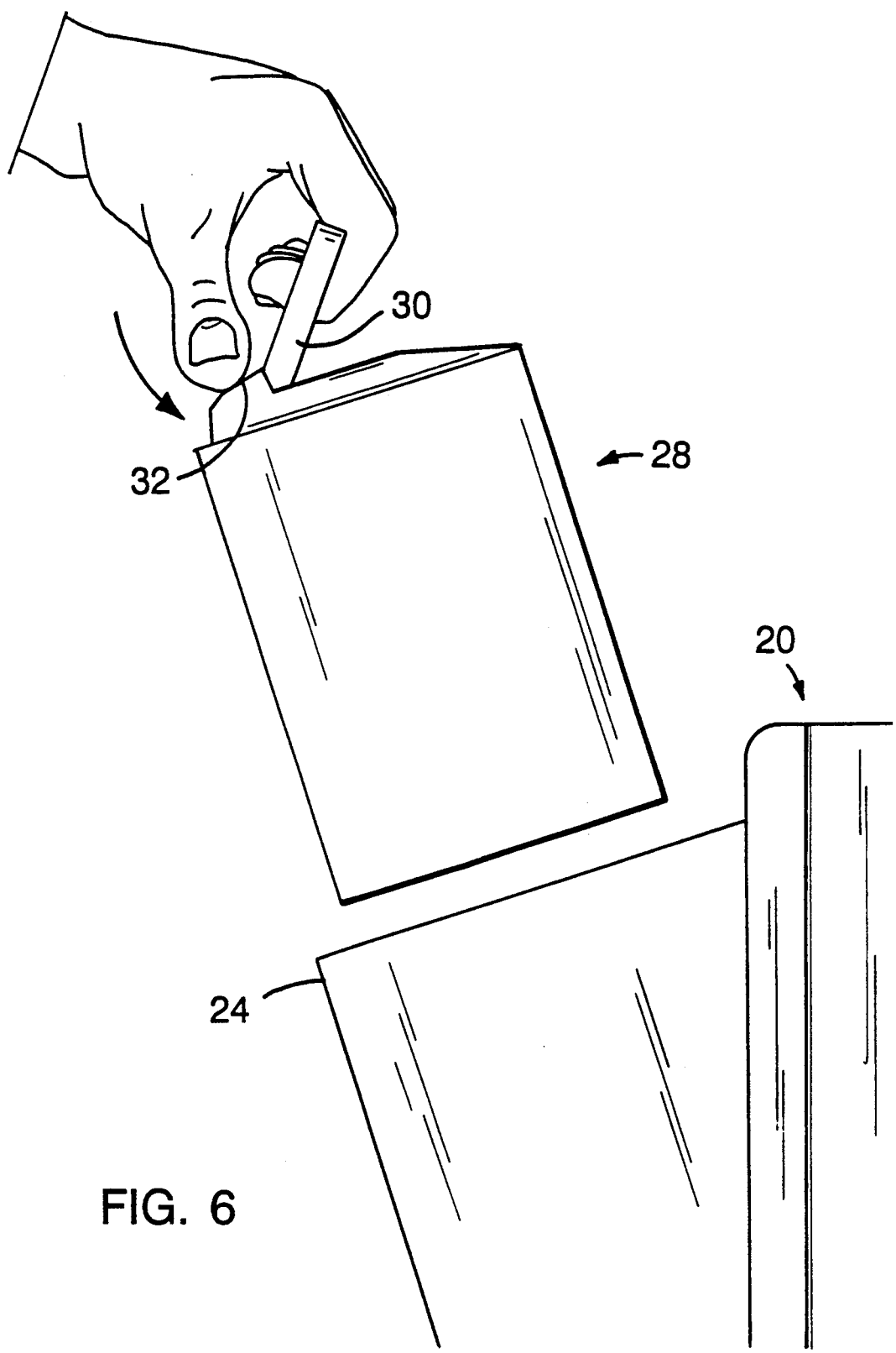
FIG. 6 is a side elevation of the magazine of FIG. 2 being inserted into the receiver.

Also simplifying insertion is the placement of the thumb rail 32 with respect to the handle 30 (see FIG. 6). The thumb rail has been placed in a position close to that where the user's thumb would normally tend to rest. This makes it easy for the user to adjust the attitude of the magazine by applying light pressure with his or her thumb, and to insert the magazine into the receiver at an angle close to that of the opened receiver 24.

Another element provided to ease the insertion of the magazine is a pair of tapered guide channels 34 on the outside of the magazine that interact with a pair of ribs 128 on the inside of the receiver (see FIGS. 4 and 18). The flared base 35 of the channel 34 can engage the rib 120 at a variety of angles. As the magazine is inserted, however, the taper of the channel will cause the magazine to align itself exactly with the receiver. This allows the user to insert the magazine rather casually while ensuring precise placement of the magazine in the receiver. The channels and ribs guide the magazine during a significant portion of the insertion stroke and thus provide kinesthetic feedback to the user indicating that the magazine is being inserted properly.

Once the magazine has been fully inserted so that the magazine is resting on the floor of the receiver, the user simply pivots the receiver into a closed position where it is retained by a pair of pawls 116 interacting with a pair of catches 120 (see FIG. 16). It should be noted that a spring 33 (FIG. 4) causes the handle to retract onto the top of the magazine when not in use, reducing space requirements in the loader.

Figure 7:
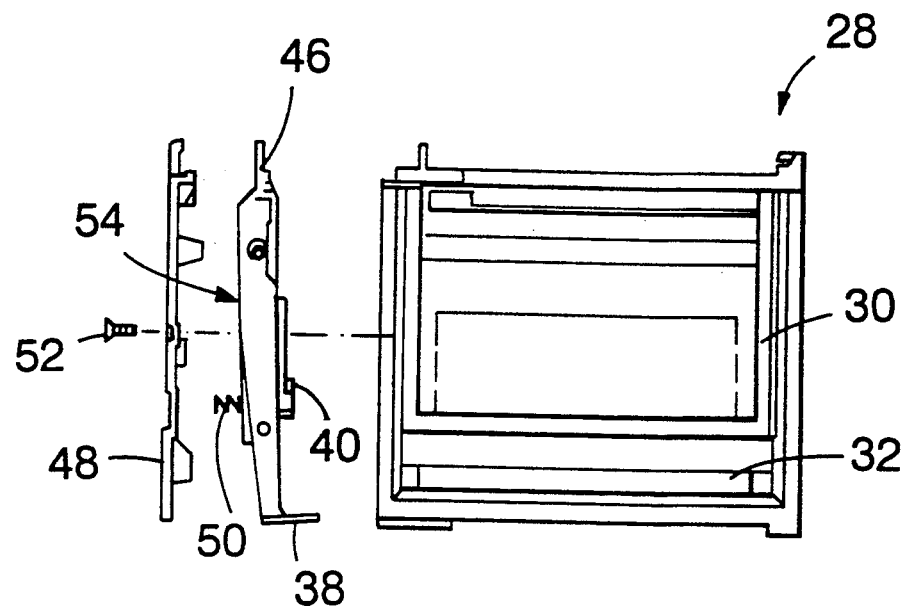
FIG. 7 is a plan view of the magazine of FIG. 2 with its right side panel removed and one of its push-push mechanisms exposed.

The magazine 28 includes a right side cover 48 that is snap fit to the main body of the magazine and can additionally be kept in place with a screw 52 as may be seen in FIG. 7. The cover encloses the push-push mechanisms 54 and provides a surface for biasing a spring 50.

Figure 8:
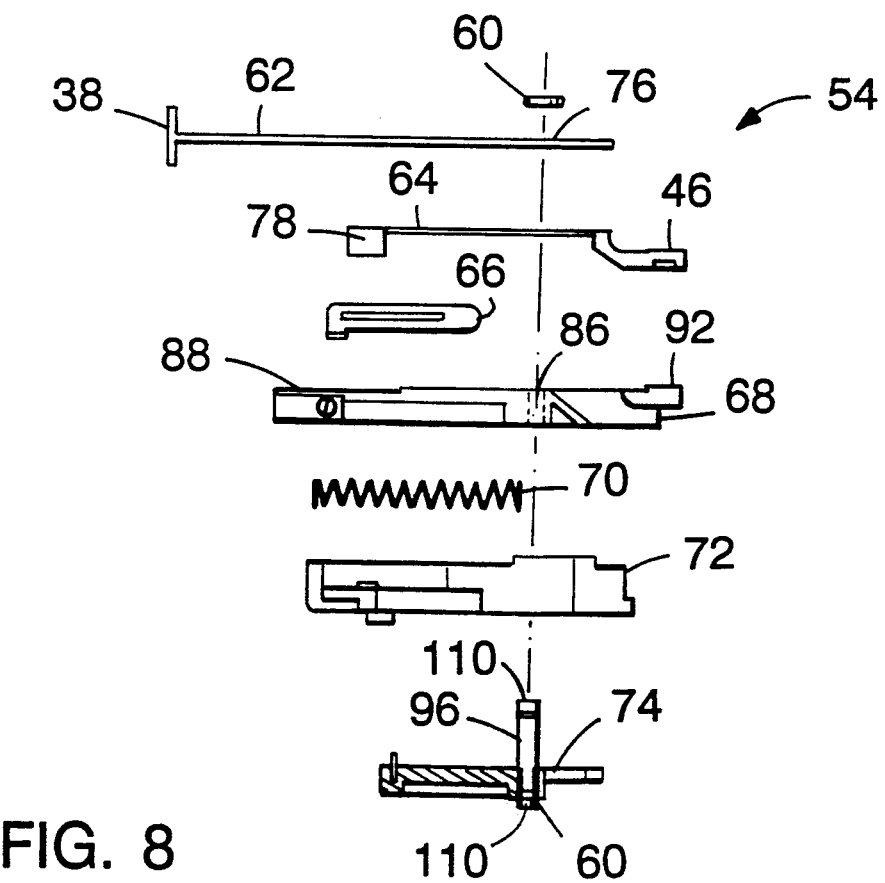
FIG. 8 is an exploded top view of a push-push mechanism shown in FIG. 7.

The push-push mechanism and its component parts are shown in more detail in FIGS. 8-15. Referring to FIG. 8, a galvanized steel retention lever 62 includes the stop 38 and is mounted next to a thin chrome-plated steel shutter 64 which includes a flag end 46. The flag end of the shutter passes through a slot 84 in a release lever 68 (FIG. 12) and protrudes out its end next to a bearing surface 92. The slide also has a tab 78 that interacts with a slotted plate 66. This slotted plate sits on the release lever and protrudes into a gap 104 in a lock lever 72 (FIG. 14).

A finger 108 (FIG. 14) on the lock lever interacts with a depression 88 on the release lever to hold the two parts in a sliding relation. A spring 70 biases these two levers with respect to each other. A cam follower 74 is mounted on the lock lever and interacts with a cam surface 100 thereon (FIGS. 14 and 15). The lock lever, release lever and cam followers are made of injection molded plastic.

A shaft 96, in conjunction with two clips 60, holds the push-push mechanism together. The shaft passes through holes 76, 86 in the retention lever 62 and the release lever 68 and these parts are thus able to rotate about the shaft to some extent. The shaft also passes through a slot 102 (FIG. 14) in the retention lever allowing it to move longitudinally with respect to the other parts of the push-push mechanism. The shutter 64 includes a notched hole 80 (FIG. 10) through which the shaft protrudes, affording it a degree of longitudinal motion as well. The ends 110 of the shaft sit in channels in the housing of the magazine in a fixed position.

Referring to FIG. 14, the slide 40 is part of the lock lever 72. This slide is pushed by part of a cartridge when it is inserted into a cell. The pushing action causes the lock lever to slide forward with respect to the release lever 68 against the resistance of spring 70 (See FIG. 8). This is the resistance felt by the user when inserting a cartridge.

During this initial pushing period, the pin 90 (FIG. 13) of the cam follower 74 follows the cam surface 100 in the lock lever (FIG. 15) from its resting point 150 along a straight surface 152 and around a corner 154. When the follower reaches the corner, the resilient projection 94 (FIG. 13) of the cam follower 74 interacts with a peg 98 on the lock lever which biases it towards the lower outside surface 155 of the corner 154. When the user releases the cartridge, the spring 70 pushes the lock lever and the pin of the cam follower is brought to rest at the second resting point 156 of the push-push mechanism.

Also during this inward stroke of the lock lever, the cam-shaped cut 58 on the retention lever 62 (FIG. 9) interacts with the follower area 112 (FIG. 14) of the lock lever. This interaction causes the retention lever to pivot on shaft 96 and thus move the stop 38 in front of the cartridge, locking it in place.

Furthermore, during the lock lever's inward stroke, a gap 104 (FIG. 14) in the lock lever pushes the tab 82 of slotted plate 66 (FIG. 11), and moves it along. When the lock lever has reached a certain point in its stroke, the rear end 69 of the slot 63 in the plate begins to push the shutter 64 by its tab 78 (FIG. 10). This causes the shutter's flag portion 46 to be pushed into a position indicating the presence of a cartridge. The part of the cartridge 36 that pushes the slide 40 may be executed in different ways creating different type cartridges. Different types of cartridges will move the slide 40 to different degrees and thus push the flag portion into different positions. As was mentioned earlier, the position of the flag may be read by an optical detector in the loader.

In the inserted position, the cartridge is securely held in its cell. The cartridge may be released by the loader's cartridge transfer mechanism when the magazine is in the loader and the receiver is closed. The loader mechanism releases the cartridge by pushing the bearing surface 92 of the release lever inward. For a discussion of the loader mechanism that performs this function, see our co-pending application entitled "Cartridge Transfer Mechanism for Media Cartridge Loader" (DEC PD90-0360), filed the same day as this application by Gunther Schneider and Klaus Paulat, which is herein incorporated by reference.

When the bearing surface 92 is pushed inward, the whole push-push mechanism is tilted slightly in the plane of the cartridge against the bias of the spring 50 (FIG. 7). This causes the slide 40 to be pulled outward, away from the cartridge, and frees the cartridge to move forward. The loader is then able to move the cartridge out of the magazine and into an associated drive. This is accomplished by applying a driven roller on the loader (not shown) to the end of the side of the cartridge accessible through the slot 93 (FIG. 4) provided in the back side of the receiver. The roller presses the opposite side of the cartridge against the idler rollers 41 for the same cell on the other side of the receiver which permit the cartridge to be slipped out of the back of the cell into the loader. When the loader has finished with the cartridge, it returns it to a cell in the magazine. It should be noted that the bias from the spring 50 between the spring retaining peg 91 of the lock lever (FIG. 12) and the right cover 48 (FIG. 7) is sufficient to maintain the cell's cartridge locked in place when the loader mechanism is not accessing it.

If the user wants to remove a cartridge from the magazine, he or she must first remove the magazine from the loader. The user then presses on the cartridge in the manner described earlier as shown in FIG. 3. This again causes the lock lever 72 to move forwards. This time, the pin 90 on the cam follower 74 moves around the second corner 158 of the Cam surface 100 (FIG. 15), and remains in a position ready to move down the two remaining straight sections 159 and 160. When the user stops pushing the cartridge inward and lets the force of the spring 70 push it out, the pin moves back into its first rest position 150 via the two remaining straight sections.

During this return stroke, the cam-shaped cut on retention lever 62 is moved by the follower area 112 of the lock lever, resulting in the retraction of the stop. Without the stop in place, the spring 70 can push the cartridge out of the magazine by about five eighths of an inch.

Toward the end of the return stroke, the front end 67 of the slot 63 in the plate 66 pushes the tab 78 of the shutter 64, thus pulling the flag into the empty-cell position. It should be noted that the shutter 64 includes a notched hole 80 (FIG. 10) which restricts the flag to one of three definite positions.

It is important that the loader not be interacting with the magazine when it is removed from the receiver. As can be seen in FIG. 16, this condition is satisfied by providing an automated receiver opening mechanism that is actuated when the loader cartridge transfer mechanism 168 is in a docked position and out of the way of the cartridges and the magazine. At the lowermost position, the transfer mechanism presses forward against the first bar 170 of the release linkage 118. This causes the second bar 172 to pull on the third bar 174 rotating the fluted shaft 114. Rotation of this fluted shaft causes the attached resilient pawls 116 to be pulled from their locked positions in the catches 120.

A first spring 122 causes the receiver to rotate into an open position. This spring may be a coil spring as shown in FIG. 16 or it may be a leaf spring mounted under the receiver. If a magazine is present in the receiver, the magazine will interact with a supplementary ejection mechanism 124.

Referring to FIGS. 19 and 20, this mechanism includes a magazine catch 130 with a hook 131 that interacts with the magazine. The catch 130 is slidably held in a slot 133 of a guide bracket 132 by two posts 136 and four clips 138. These posts also secure the bracket to the top of the loader frame 167. When the receiver is closed with a magazine in it, the top corner of the magazine pushes the catch 130 backwards thus extending a spring 140. When the receiver is opened, this spring will provide assistance to the base spring 122 by pushing on the magazine. The interaction of these two springs will cause the receiver to open with a similar degree of force whether it is loaded or unloaded.

Other embodiments are within the scope of the following claims. For example, the window could be made to be hinged or could be left eliminated, leaving a hole such that the user could interact with the cartridges while the magazine is in the loader. This would allow a user to change cartridges or to adjust their write protect tabs without ejecting the whole magazine.

What is claimed is:

1. A data cartridge loader for loading cartridges in a device for recording and/or reproducing comprising:
   a removable magazine having a plurality of parallel slots for data storage cartridges,
   a cabinet having a front panel with an opening through which said magazine is received,
   a tilting bin-like receiver having an open top and a bottom pivotally connected to said cabinet in said opening of said front panel and mounted in said cabinet such that said receiver can tilt away from said cabinet to an open position along an axis at the bottom of said receiver lying approximately in the plane of said front panel and toward said cabinet to a closed position wherein said receiver is substantially within said cabinet and covers said opening of said front panel, said magazine in its entirety being removably received in said magazine in its entirety being removably received in said receiver through said open top thereof when said receiver is in said open position, said receiver being returnable to said closed position with said magazine inside.

2. The data cartridge loader of claim 1 wherein
   said magazine has four sides and includes at least one guide channel on one of its said sides, and
   said receiver has three sides and includes at least one rib on one of its sides, said rib interacting with said channel to guide said magazine into a predetermined position in said receiver upon insertion of said magazine into said receiver.

3. The data cartridge loader of claim 2 wherein said channel includes a tapered portion.

4. The data cartridge loader of claim 1 further including
   a first spring member connected to said cabinet and positioned to apply a force to said receiver, said force assisting in moving said receiver to said open position, and
   a second spring member connected to said cabinet and positioned to apply a force to said magazine inside said receiver, said force assisting in moving said receiver to an open position only if said magazine is present in said receiver.

5. The data cartridge loader of claim 1 wherein
   said receiver further includes a pair of notches, and
   a latch mechanism mounted in said cabinet including
      a shaft,
      a pair of pawls mounted on said shaft, said pawls engaging said notches in said receiver to maintain said receiver in a closed position, and
      an opening linkage for rotating said shaft to disengage said pawls from said notches and to thereby allow said receiver to be opened.

6. The data cartridge loader of claim 1 wherein said receiver further includes
   a window for viewing said cartridges in said magazine.

7. The cartridge loader of claim 1, wherein said receiver has a front side which is approximately flush with said front panel when said receiver is in said closed position.

8. A data cartridge loader for loading cartridges in a device for recording and/or reproducing comprising:
   a receiver mounted to tilt at a predetermined tilt angle when open in a receiving position;
   a removable magazine for insertion in said receiver, said magazine comprising:
      a rack defining a plurality of parallel storage cells for storing individual data storage cartridges, wherein said rack has a top and bottom and open parallel front and back sides; and
      a handle, said handle being hinged to the top of said rack adjacent to said front side on a horizontal pivot axis parallel to said front side, and wherein a handle stopping piece is mounted on the top of said rack for predetermining the angular position of said handle such that the center of gravity of said magazine is aligned with said handle so as to cause said magazine to hang at a tilted attitude when said magazine is held by the handle, the tilt of said magazine corresponding approximately to said tilt angle of said receiver.

* * * * *